United States Patent [19]

Kendall-Smith et al.

[11] 4,127,555

[45] Nov. 28, 1978

[54] PIGMENTATION OF PLASTICS MOULDING MATERIAL

[75] Inventors: Brian J. Kendall-Smith, Weoley Hill; Fredrick J. Parker, Wylde Green; Norman B. Nicklin, Halesowen, all of England

[73] Assignee: British Industrial Plastics Limited, Manchester, United Kingdom

[21] Appl. No.: 617,504

[22] Filed: Sep. 29, 1975

[30] Foreign Application Priority Data

Oct. 1, 1974 [GB] United Kingdom ............... 42516/74

[51] Int. Cl.² ............................................. C08L 61/06
[52] U.S. Cl. .................................. 260/37 N; 264/211; 264/349
[58] Field of Search ............. 260/39 NP, 39 P, 39 M, 260/40 P, 40 NP, 37 N; 264/349, 211

[56] References Cited

U.S. PATENT DOCUMENTS

| | | | |
|---|---|---|---|
| 2,813,302 | 11/1957 | Beck | 264/349 |
| 2,857,624 | 10/1958 | Hanzel et al. | 264/349 |
| 3,078,511 | 2/1963 | Street | 264/349 |
| 3,148,412 | 9/1964 | Spreeuwers | 264/349 |
| 3,461,490 | 8/1969 | Cottingham | 264/236 |
| 3,517,095 | 6/1970 | Dunnington et al. | 264/349 |
| 3,792,020 | 2/1974 | Huck et al. | 260/39 M |
| 3,817,675 | 6/1974 | Maiocco | 264/349 |
| 3,855,173 | 12/1974 | Huck et al. | 260/39 M |
| 4,013,276 | 3/1977 | Boham et al. | 259/191 |

FOREIGN PATENT DOCUMENTS

| | | | |
|---|---|---|---|
| 2,514,307 | 6/1975 | Fed. Rep. of Germany. | |
| 2,303,366 | 7/1974 | Fed. Rep. of Germany | 264/349 |
| 2,514,307 | 6/1975 | Fed. Rep. of Germany | 264/349 |
| 358,188 | 6/1972 | U.S.S.R. | 264/211 |

OTHER PUBLICATIONS

Modern Plastics Encyclopedia, pp. 455 and 456, 1968.

*Primary Examiner*—Jay H. Woo
*Attorney, Agent, or Firm*—Charles E. Brown

[57] ABSTRACT

A method of producing pigmented extrudates or mouldings from an unpigmented thermosetting moulding material, which comprises roughly blending a pigment component with an aminoplast moulding material substantially free from pigment and having an average particle size not greater than 150 microns, and completely dispersing the pigment compound through the aminoplast moulding material by progressing the rough blend through an extruder or injection moulding machine having a barrel grooved in accordance with German Offenlegungschrift No. 2514307, and extruding or injection moulding the resulting pigmented material.

10 Claims, No Drawings

PIGMENTATION OF PLASTICS MOULDING MATERIAL

This invention concerns improvements in or relating to the pigmentation of thermosetting synthetic plastics moulding materials.

Such moulding materials are produced in various forms determined by, inter alia, the intended method of moulding for example compression moulding or injection moulding.

Normally, these materials are pigmented to produce coloured moulding materials, the pigmentation process involving intimately dispersing the pigment particles with the particles of moulding compound. One method of achieving this is by ball-milling a coarsely powdered moulding compound (hereafter referred to as 'coarse powder') with at least one pigment to produce a finely powdered pigmented intimate mixture (hereafter referred to as 'fine powder').

Since there are difficulties in compression moulding fine powder (owing to its low bulk density) and also in injection moulding fine powder (owing to its poor feeding and plasticizing effects in standard injection moulding machinery), the fine powder is, generally, converted into granular moulding material. Granular moulding material is thus widely used for both injection and compression moulding. However, owing to the additonal processing and capital investment necessary for its production, granular moulding material is more expensive than coarse powder or fine powder moulding material.

An object of the present invention is to obviate or mitigate the expense involved in producing pigmented thermosetting moulding material, particularly the injection moulding grades.

According to the present invention, a method of producing substantially homogeneously pigmented extrudates or mouldings from a thermosetting moulding material comprises roughly blending a pigment component with an aminoplast moulding material having an average particle size not greater than 150 microns, before, during or after supplying the pigment component and aminoplast moulding material to the hopper of an extruder or injection moulding machine having a screw housing as defined in German Offenlegungschrift No. 2514307 which is based on U.K. Patent Application 15987/74 of Apr. 4, 1974, which application is also the priority application for U.S. application Ser. No. 559,980, filed Mar. 19, 1975; and now U.S. Pat. No. 4,013,276, effecting complete dispersion of the pigment component through the aminoplast moulding material whilst in the extruder or injection moulding machine, and extruding or injection moulding the resultant pigmented thermosetting moulding material.

Thus, we have found that, by using an extruder or injection moulding machine having a screw housing grooved in accordance with the concepts set forth in our aforesaid Offenlegungschrift and U.K. and U.S. applications, it is possible to obtain homogeneously pigmented thermoset artefacts from synthetic plastics moulding materials, without the necessity for granulating fine powder, and even without the necessity for ball-milling or otherwise pulverising a relatively coarse powder.

By "coarse powder" in the present context we mean a pulverulent material having an average particle size of not more than about 150 microns, preferably of not less than 75 microns. A "fine powder" is, accordingly, a pulverulent material having an average particle size up to about 75 microns preferably from about 40 to 70 microns. By "rough blending" we mean the action of producing an inhomogeneous blend or mixture of pigment component and thermosetting moulding material.

When the aminoplast moulding material is based on melamine-formaldehyde resin, the average particle is preferably not less than 75 microns, otherwise adequate compounding may not be possible.

The pigment component may be a pigment per se, or may be a masterbatch consisting of a pigment homogeneously blended or coated with a thermosetting plastics composition; whether a pigment per se or masterbatch is used, will depend on the ease of dispersion of the pigment component in the thermosetting moulding material, difficultly dispersible pigments being preferably (and in some cases, necessarily) used in the form of masterbatches. The ease of dispersion may depend on the flow characteristics of the thermosetting moulding material.

Preferably the weight ratio of pigment to thermosetting plastics composition in the masterbatch is from 5 to 50, more preferably 5 to 20, times the weight ratio of pigment to total thermosetting material required for the resultant pigmented thermosetting moulding material. Preferably the pigmented thermosetting moulding material comprises from 0.1 to 10% by weight of pigment, and more preferably comprises not more than 5% by weight of the pigment(s).

The masterbatch may be obtained by mixing pigment with a thermosetting plastics composition during production of the latter and whilst it is in the "wet" state, and drying the resultant mixture, or by mixing pigment with dry thermosetting plastics composition, to produce a homogeneous blend. Ball-milling or equivalent treatment may be necessary to obtain a sufficient degree of pre-dispersion of the pigment in the masterbatch, but the masterbatch may be produced in any one of various physical forms, preferably as powder. The thermosetting plastics composition of the masterbatch and the thermosetting moulding material will normally (but need not necessarily) comprise the same thermosetting resin.

The rough blending of the pigment component with the thermosetting moulding material may be effected by mixing pigment per se or masterbatch in a tumbler or blender prior to supplying the roughly blended material, without intermediate processing, to the hopper of an injection moulding machine. Alternatively the pigment component and thermosetting moulding material may be roughly blended during or after supply thereof to a stirred hopper machine and prior to injection moulding that portion of the material in the hopper.

It will be appreciated that the initial thermosetting moulding material is, prior to roughly blending with the pigment component, substantially unpigmented, and is in a substantially dry condition.

The following examples illustrate preferred embodiments of the invention.

EXAMPLE 1

(A) An unpigmented thermosetting moulding material was produced in the form of a powder of average particle size of from 50 to 64 microns, by a standard method, from:
950 parts by weight aqueous urea formaldehyde resin (urea: formaldehyde ratio = 1:1.33, solids content 65% by weight)

250 parts by weight - cellulose filler
3.3 parts by weight acid catalyst
12.0 parts by weight buffer
6.2 parts by weight mould lubricant
8.3 parts by weight plasticizer
18.7 parts by weight mineral filler (B) The unpigmented material from (A) was roughly blended in a Morton Blender for 10 minutes, with (percentages by weight of the unpigmented material):

2% flow modifier
0.125% lubricant
1% Blue G.L.S. R. (Ciba Geigy (U.K.) Ltd.)
0.8% Blue R.S.2 (Reckitt's Colours Ltd.)
0.12% Black D.C.70 (Blythe Colours Ltd.)
0.1% White R.H.42 (Laporte Industries Ltd.)

the last four of the above ingredients forming the pigment component.

The resultant roughly blended mixture was introduced into the hopper of a BIPEL D.S.T. 155/50 injection moulding machine (BIPEL is a registered trade mark of British Industrial Plastics Ltd.) the machine being modified by having a screw housing with 6 semi-elliptical grooves internally disposed as described in German Offenlegungschrift No. 2514307 and extending from the feed zone and through the intermediate and nozzle zones of the housing.

Mouldings were made under the following conditions

| Barrel Temperature | | 85° C |
|---|---|---|
| Mould Temperature | - Fixed | 140° C |
| | - Moving | 145° C |
| Injection Speed | | 3 secs |
| Hold-on Pressure | | 500 p.s.i. |
| Screw Speed | | 55 R.P.M. |
| Screw Back Time | | 8-10 secs |
| Cure Time | | 20 secs |
| Overall Cycle Time | | 40 secs |

The mouldings exhibited good, uniform pigmentation with no noticeable pigment specks.

The technique of direct pigmentation with pigment per se as illustrated in Example 1 is not successful with all pigment formulations, and then resort must be made to a master batching technique as illustrated in the following Example.

EXAMPLE 2

(A) Unpigmented thermosetting material was produced as described in Example 1(A).

(B) A pigment master batch was produced by adding to the material of (A) a pigment component consisting of (percent by weight of (A)):
Magenta RV 6804 (Allied Chemicals Ltd.) 0.025%
Tangerine P 4020 (Blythe Colours Ltd.) 0.060%
White R.H. 42 (Laporte Industries Ltd.) 0.2%

The masterbatch was ball-milled until the pigments were adequately dispersed (checked by effecting moulding tests). The resultant masterbatch, containing 10 times the concentration of pigment required in the articles to be moulded, was roughly blended with unpigmented thermosetting moulding material produced as in (A), modifer and lubricant, in the following proportions by weight, by tumbling the ingredients together in a sealed container on mixing rolls for 10 minutes:

| Thermosetting moulding material (A) | 900 |
|---|---|
| Flow modifier | 20 |
| Lubricant | 1.25 |
| Masterbatch | 100 |

The resultant rough blend was introduced to the hopper of the injection moulding machine described in Example 1, and mouldings were produced under the same conditions.

The mouldings exhibited excellent uniform pigmentation with no visible traces of undispersed pigments.

EXAMPLE 3

(A) An unpigmented thermosetting moulding material was produced in the form of a powder of average particle size of 100 microns by a standard method from
625 parts by weight aqueous melamine formaldehyde resin (melamine: formaldehyde ratio = 1:2, solids content 57% by weight)
125 parts by weight cellulose filler
43 parts by weight mineral filler
15.3 parts by weight flow promoter
3.7 parts by weight mould lubricant (B) A pigment masterbatch was produced by adding to the material of (A) a pigment component consisting of (percent by weight of (A)):
0.45% Ultramarine RS2 (Reckett's Colours Ltd.)
0.16% Magenta RV6804 (Allied Chemicals Ltd.)
3.5% Ultra Rose RS11 (Reckett's Colours Ltd.)
0.7% White RH42 (Laporte Industries Ltd.)

The masterbatch was ball-milled until the pigments were adequately dispersed (checked by effecting moulding yests). The resultant masterbatch, containing 10 times the concentration of pigment required in the articles to be moulded, was blended with unpigmented thermosetting moulding material produced as in (A), with mould lubricant in the following proportions by weight using a Morton Blender.

| Thermosetting moulding material (A) | 900 |
|---|---|
| Lubricant | 5 |
| Masterbatch | 100 |

The resultant rough blend was introduced to the hopper of the injection moulding machine described in Example 1, and mouldings were produced under the same conditions.

The mouldings exhibited excellent uniform pigmentation with no visible traces of undispersed pigments.

The aminoplast moulding material supplied initially to the machine will generally be substantially unpigmented, although production of a masterbatch may still require the use of a ball-mill or equivalent processing machinery, as illustrated above, the capacity of this machinery and hence the operational cost is considerably reduced with respect to that which would be involved in producing pigmented thermosetting moulding materials by the methods hitherto used.

The disclosure of German Offenlegungschrift No. 2514307 is incorporated herein by way of reference.

We claim:
1. A method of producing substantially homogeneously pigmented injection mouldings from a thermosetting moulding material, said method comprising supplying an injection moulding machine of the type hav- ing a screw housing having a hopper, a feed zone and intermediate and nozzle zones, and an internal wall defining a screw receiving bore, and wherein the internal wall is provided with grooves extending along the bore from the feed zone and through the intermediate and nozzle zones; supplying a non-homogeneous mixture of pigment component and an aminoplast moulding material having a particle size not greater than 150 microns to the hopper of the moulding machine and utilizing the screw housing to effect complete substantially homogeneous dispersion of the pigment component through the aminoplast moulding material, and injection moulding the resultant pigmented thermosetting moulding material.

2. A method according to claim 1, wherein the pigment component is a pigment per se.

3. A method according to claim 1, wherein the pigment component is a masterbatch consisting of a pigment homogeneously blended with a thermosetting plastics composition.

4. A method according to claim 1, wherein the pigment component is a masterbatch consisting of pigment coated with a thermosetting plastics composition.

5. A method according to claim 3, wherein the weight ratio of pigment to thermosetting plastics composition in the masterbatch is from 5 to 50 times the weight ratio of pigment to total thermosetting material in the resultant pigmented thermosetting moulding material.

6. A method according to claim 4, wherein the weight ratio of pigment to thermosetting plastics composition in the masterbatch is from 5 to 50 times the weight ratio of pigment to total thermosetting material in the resultant pigmented thermosetting moulding material.

7. A method according to claim 1, wherein from 0.1 to 10 percent by weight of pigment (based on the total weight of pigmented thermosetting moulding material) is dispersed in the aminoplast material.

8. A method according to claim 1, wherein a pigment masterbatch is produced by mixing a pigment with a thermosetting plastics composition during production of the latter whilst it is in a 'wet' state, the resultant mixture is dried to form a dry pigment masterbatch, and the dry pigment masterbatch is roughly blended with the aminoplast moulding material.

9. The method of claim 1 wherein the pigment component and the aminoplast moulding materials were blended together during the supplying thereof to the hopper.

10. Mouldings when produced by a method as defined in claim 1.

* * * * *